United States Patent [19]
Ikeda et al.

[11] Patent Number: 6,145,384
[45] Date of Patent: Nov. 14, 2000

[54] CAPACITIVE TRANSDUCER HAVING GUARD ELECTRODE AND BUFFER AMLIFYING MEANS

[75] Inventors: Masaharu Ikeda, Yokohama; Masayoshi Esashi, Sendai, both of Japan

[73] Assignee: Matsushita Electric Industrial Co., Ltd., Osaka, Japan

[21] Appl. No.: 09/348,827

[22] Filed: Jul. 8, 1999

[30] Foreign Application Priority Data

Jul. 14, 1998 [JP] Japan .................................. 10-213432

[51] Int. Cl.⁷ .............................. G01B 7/16; G01L 25/00
[52] U.S. Cl. .............................................................. 73/780
[58] Field of Search .............................. 73/763, 774, 780, 73/718, 724, 514.13, 514.18, 514.32, 514.33; 310/313 R, 313 B, 313 C, 313 D

[56] References Cited

U.S. PATENT DOCUMENTS

| | | | |
|---|---|---|---|
| 3,417,626 | 12/1968 | Riordan | 73/514.13 |
| 5,381,300 | 1/1995 | Thomas et al. | |
| 5,459,368 | 10/1995 | Onishi et al. | 310/313 R |
| 5,646,348 | 7/1997 | Greiff et al. | |

FOREIGN PATENT DOCUMENTS

| | | |
|---|---|---|
| 0709682 | 5/1996 | European Pat. Off. |
| 9257618 | 10/1997 | Japan |

OTHER PUBLICATIONS

European Search Report dated Oct. 28, 1999.

Primary Examiner—William Oen
Attorney, Agent, or Firm—Stevens, Davis, Miller & Mosher, L.L.P.

[57] ABSTRACT

A guard electrode is formed on a frontside surface of a semiconductor substrate and a fixed electrode is formed on the guard electrode via an insulating layer. A cavity is formed on the fixed electrode by a diaphragm and a moving electrode is formed between the layers of the diaphragm. A substrate through hole directing from a backside surface of the substrate and reaching the cavity is formed. An operational amplifier which drives the guard electrode so as to equalize an electric potential of the guard electrode with that of the fixed electrode is provided. A change in the capacitance between the fixed electrode and a moving electrode is converted into a voltage directly concerned with a displacement of the diaphragm.

14 Claims, 9 Drawing Sheets

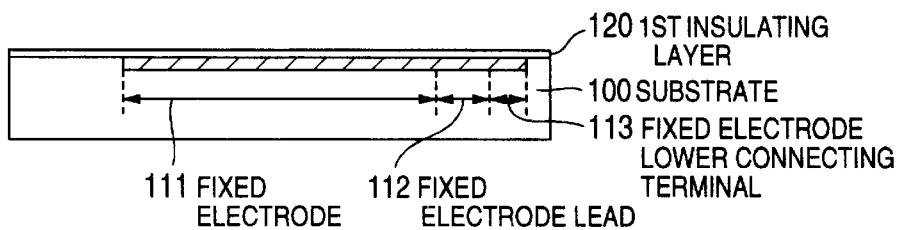
FIG.2A PRIOR ART
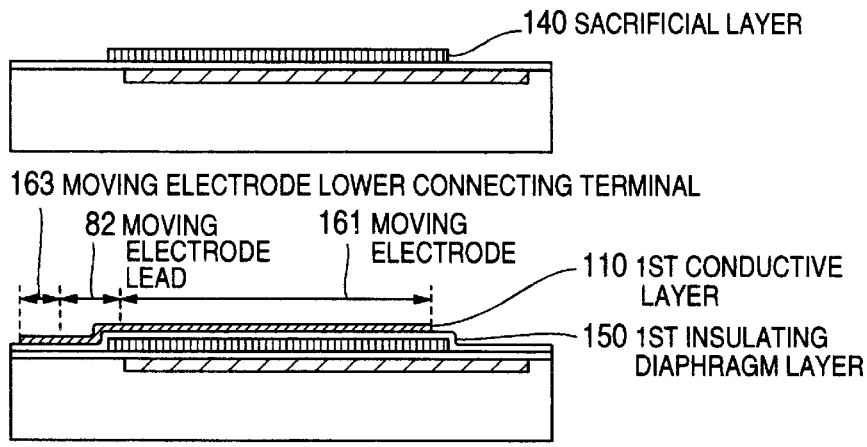
FIG.2B PRIOR ART
FIG.2C PRIOR ART
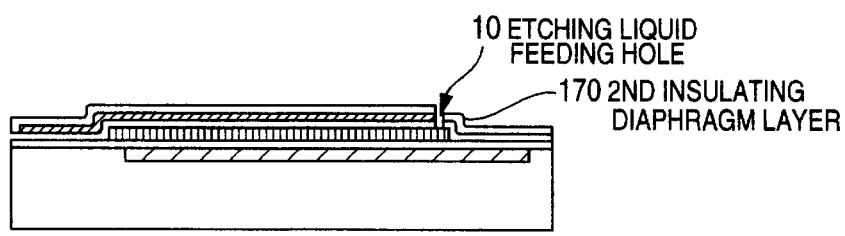
FIG.2D PRIOR ART
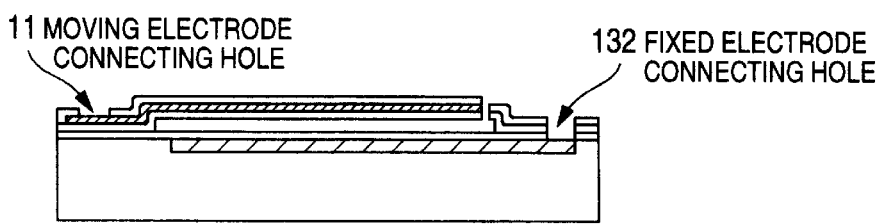
FIG.2E PRIOR ART
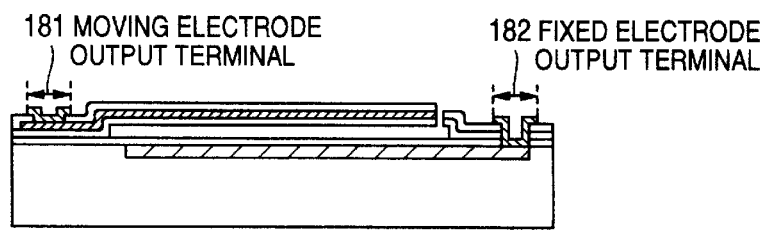
FIG.2F PRIOR ART
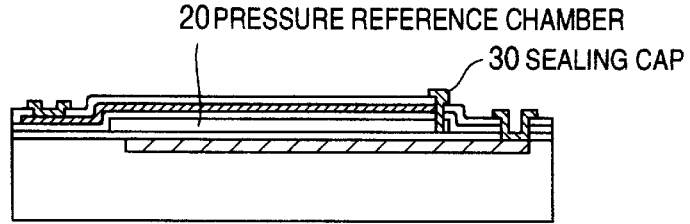
FIG.2G PRIOR ART

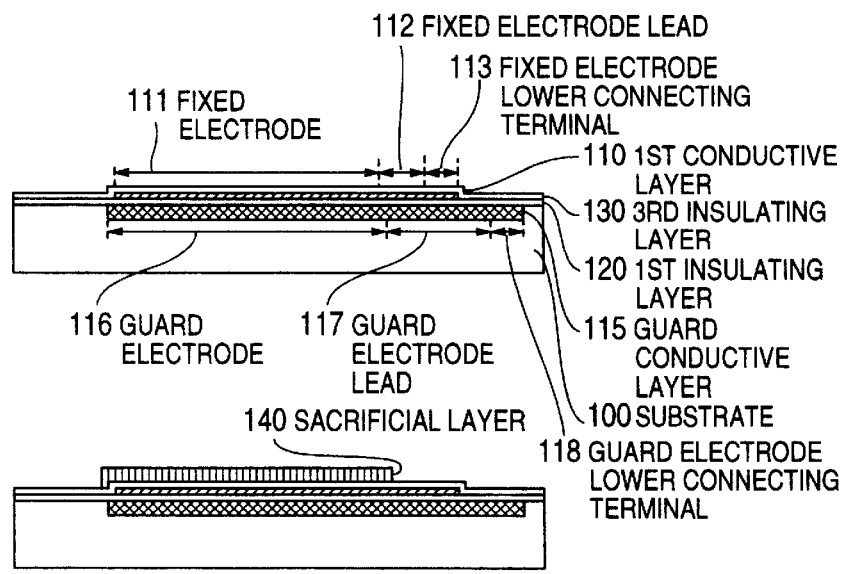
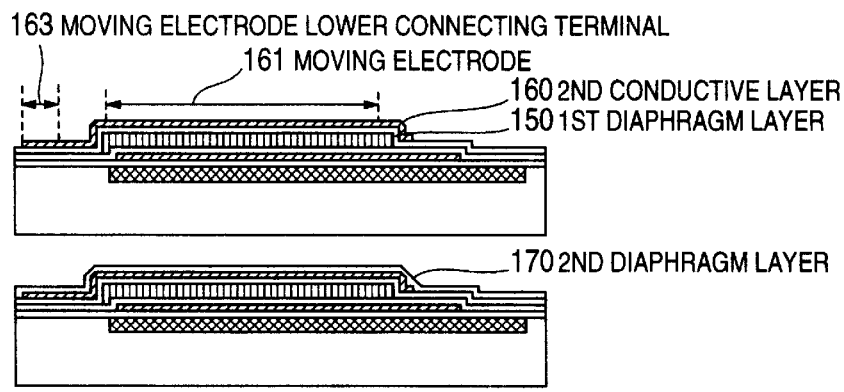
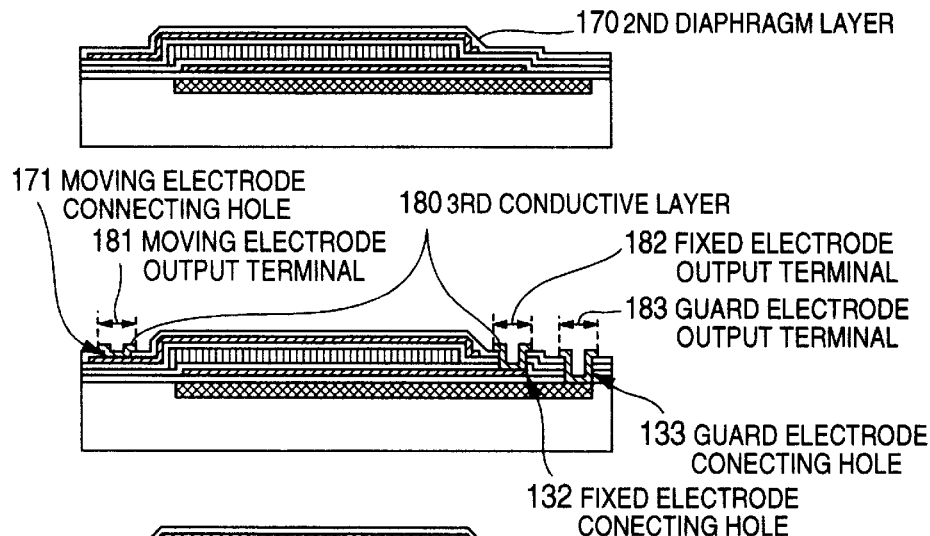
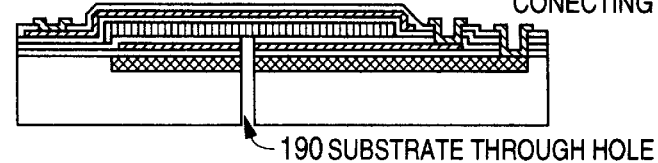
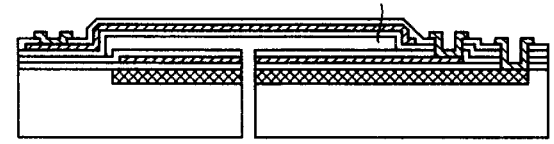

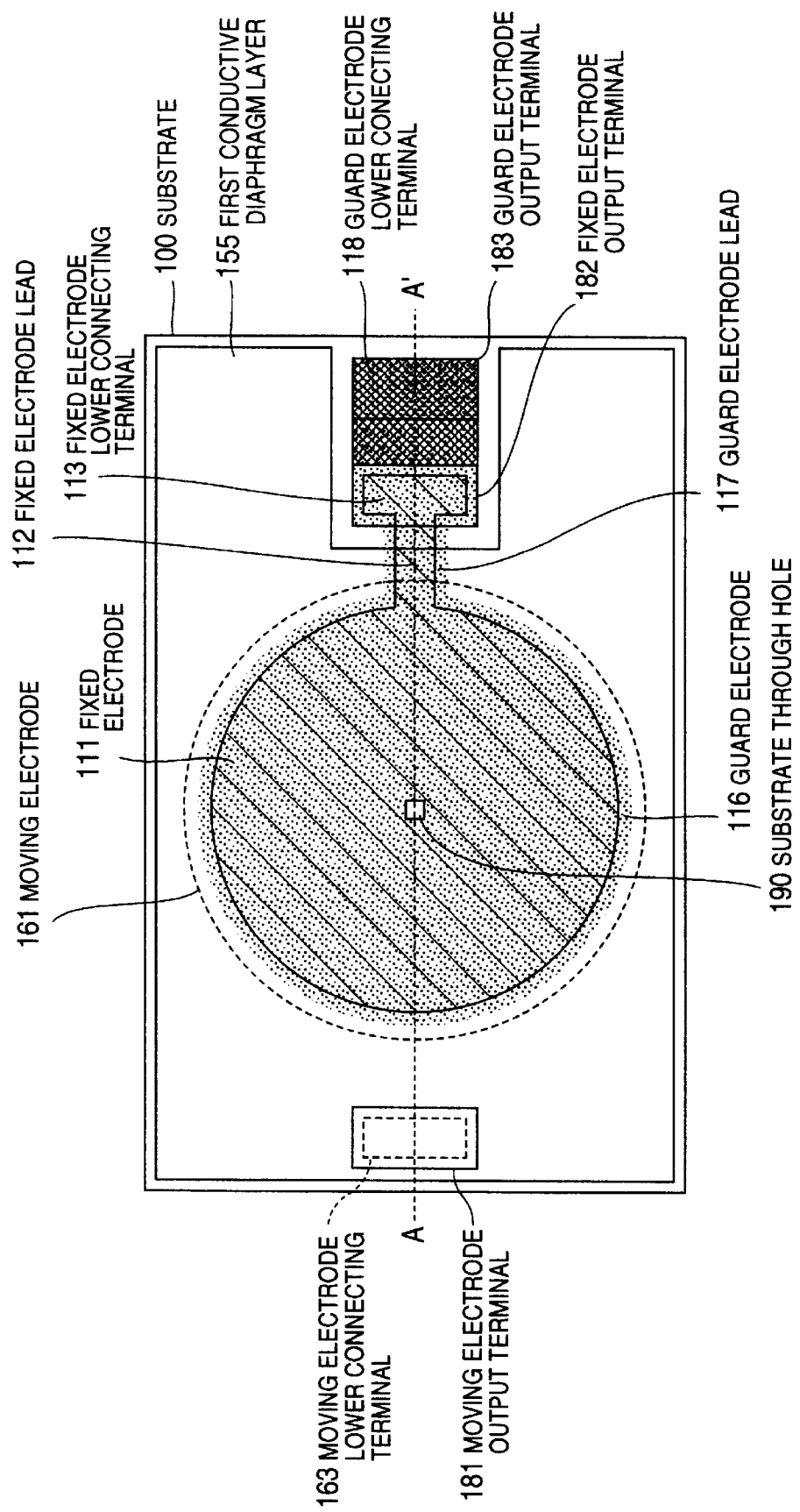

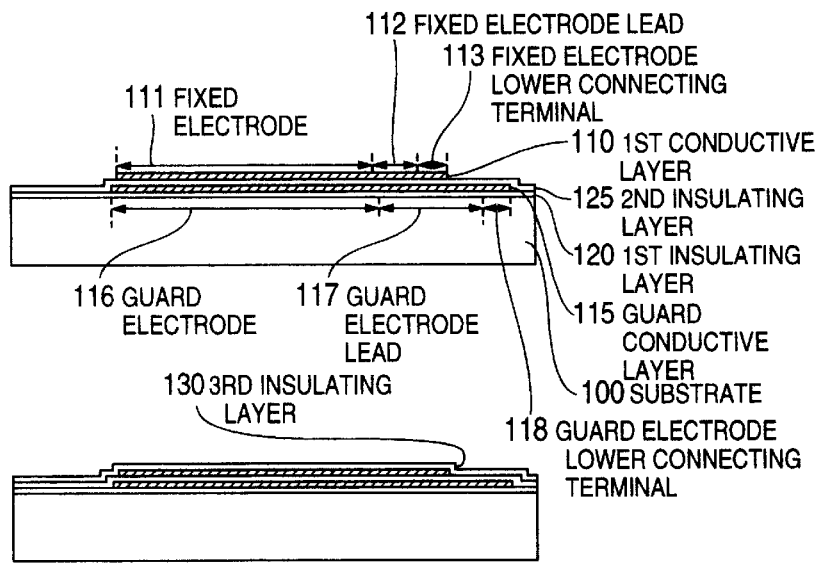
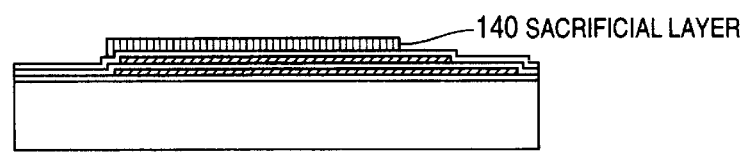
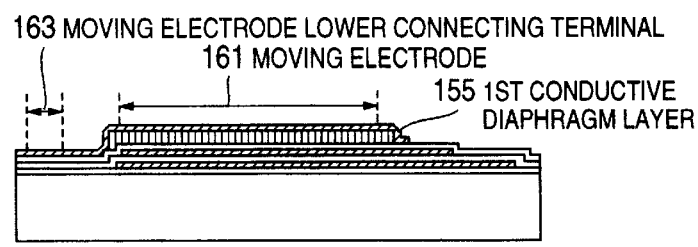
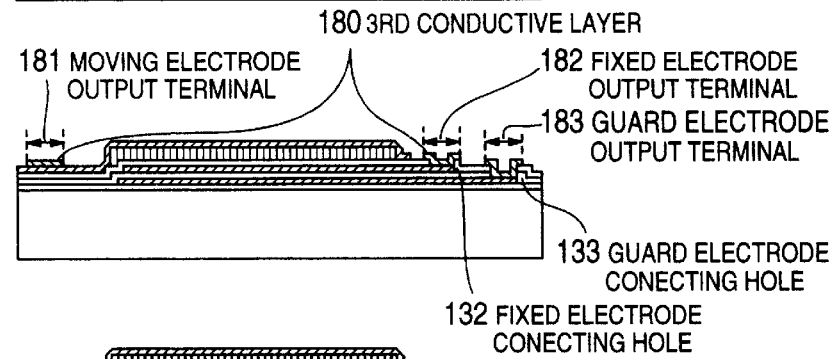
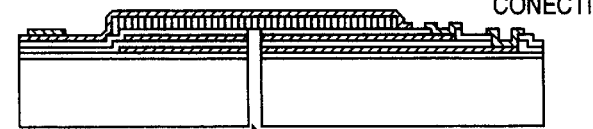
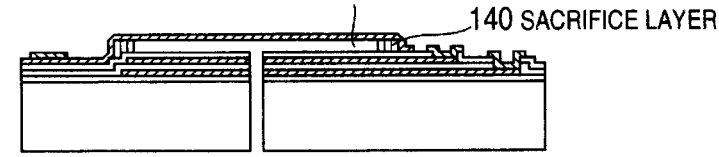

CAPACITIVE TRANSDUCER HAVING GUARD ELECTRODE AND BUFFER AMLIFYING MEANS

BACKGROUND OF THE INVENTION

The invention relates to a transducer and, more particularly, to a transducer for detecting a mechanical displacement by an electrostatic capacitance and converting it into an electric signal.

Conventionally, as a transducer for converting a displacement by a mechanical pressure into an electric signal, there is a pressure sensor of an electrostatic capacitance detecting type disclosed in JP-A-9-257618, for example. FIGS. 1–3 are diagrams showing a structure, a manufacturing process and a capacitance-to-voltage converting circuit of the transducer. FIG. 1 is a plan view of the pressure sensor and is a diagram mainly showing an arrangement of electrodes. FIGS. 2A–2G are cross sectional views taken along the line A–A' in FIG. 1 which are shown in accordance with the order of manufacturing steps. The pressure sensor is constructed by a fixed electrode formed on a frontside surface of a substrate; a pressure reference chamber provided over the fixed electrode; an insulating diaphragm formed so as to cover the pressure reference chamber; and a moving electrode as a conductive film of the surface of the insulating diaphragm.

FIG. 3 is a block diagram showing a capacitance-to-voltage converting circuit which detects the electrostatic capacitance of the fixed electrode and the moving electrode which are formed as mentioned above. The capacitance-to-voltage converting circuit is constructed by a switched capacitor circuit. The capacitance-to-voltage converting circuit shown in FIG. 3 has a reference capacitor to absorb a distribution of electrostatic capacitance values due to a dimensional variation in the manufacturing steps and a fluctuation of the electrostatic capacitance values which is caused by a dimensional change due to a temperature fluctuation or the like. The pressure sensor shown in FIG. 1 does not have a construction including such a reference capacitor. The reference capacitor can be easily constructed by adjacently forming a capacitor in which a sacrificial layer is not etched.

The outline of the manufacturing steps of the conventional pressure sensor will now be described with reference to FIGS. 2A–2G.

By diffusing the impurities into the frontside surface (surface on the upper side in the diagram) of a substrate 100 made of monocrystalline silicon, a fixed electrode 111, a fixed electrode lead 112 and a fixed electrode lower connecting terminal 113 all of which have conductivity are formed. After that, a first insulating layer 120 is deposited onto the frontside surface of the substrate 100 (refer to FIG. 2A).

Subsequently, a sacrificial layer 140 is deposited onto the first insulating layer 120 (refer to FIG. 2B). After that, as shown in FIG. 2C, a first insulating diaphragm layer 150 is deposited onto the first insulating layer 120 and the sacrificial layer 140. After that, a first conductive layer 110 is deposited onto the first insulating diaphragm layer 150. The first conductive layer 110 is etched while leaving the portion of a moving electrode 161 and the portions of a moving electrode lead 82 and moving electrode lower connecting terminal 163 which are used for the electrical connection of the moving electrode. After that, as shown in FIG. 2D, a second insulating diaphragm layer 170 is deposited onto the first insulating diaphragm layer 150 and the first conductive layer 110, and then an etching liquid feeding hole 10 which penetrates the second insulating diaphragm layer 170 and the first insulating diaphragm layer 150 and reaches the sacrificial layer 140 is formed.

Subsequently, by feeding the etching liquid for isotropically etching the sacrificial layer 140 from the etching liquid feeding hole 10, the sacrificial layer 140 is etched. Thus, as shown in FIG. 2E, a pressure reference chamber 20 is formed between the first insulating layer 120 and the first insulating diaphragm layer 150. Further, a moving electrode connecting hole 11 which penetrates the second insulating diaphragm layer 170 and reaches the moving electrode lower connecting terminal 163, and a fixed electrode connecting hole 132 which penetrates the second insulating diaphragm layer 170, the first insulating diaphragm layer 150 and the first insulating layer 120 and reaches the fixed electrode lower connecting terminal 113, are formed.

Subsequently, a conductive layer is deposited onto the frontside surface. As shown in FIG. 2F, the conductive layer is etched while leaving the portion of a moving electrode output terminal 181 connected to the moving electrode lower connecting terminal 163 through the moving electrode connecting hole 11 and the portion of a fixed electrode output terminal 182 connected to the fixed electrode lower connecting terminal 113 through the fixed electrode connecting hole 132. After that, a sealing material layer is deposited onto the second insulating diaphragm layer 170 so as to seal the etching liquid feeding hole 10. As shown in FIG. 2G, the sealing material layer is etched while leaving the portion of a sealing cap 30 near the etching liquid feeding hole 10.

As mentioned above, the conventional pressure sensor is constructed by including the substrate in which the fixed electrode is formed on the frontside surface; the first insulating diaphragm layer which partitions and forms the pressure reference chamber so as to be away from the frontside surface by only a predetermined distance; the moving electrode formed onto the first insulating diaphragm layer by the conductive layer; the second insulating diaphragm layer deposited so as to cover the moving electrode; the opening (etching liquid feeding hole) which penetrates the second insulating diaphragm layer and the first insulating diaphragm layer and reaches the pressure reference chamber; and the sealing material (sealing cap) for sealing the opening, thereby sealing the pressure reference chamber.

The diaphragm comprising the first and second insulating diaphragm layers of the conventional pressure sensor is deformed in accordance with an ambient pressure. That is, a force in the direction adapted to widen the distance between the diaphragm and the fixed electrode by a pressure from the inside of the pressure reference chamber and a force in the direction adapted to narrow the distance between the diaphragm and the fixed electrode to approach by a pressure that is applied from the outside are applied to the diaphragm, so that the diaphragm is deformed by only an amount corresponding to a difference between those forces. Thus, an electrostatic capacitance of a capacitor constructed by the fixed electrode and the moving electrode formed on the diaphragm shows a value according to the deformation of the diaphragm. By measuring the electrostatic capacitance value, the difference between the pressure in the pressure reference chamber and the pressure applied to the sensor can be known. By setting the pressure in the pressure reference chamber to a value that is enough smaller than a pressure measuring range of the sensor, the sensor can be formed as an absolute pressure measuring type.

The electrostatic capacitance value between the moving electrode and the fixed electrode of the conventional pressure sensor is measured by the capacitance-to-voltage converting circuit as shown in FIG. 3. Switches SWr, SWx, SWf and SWo of the voltage control type are connected to the upper contact (black circle) side when a clock voltage source Vck is at the high (H) level, and are connected to the lower contact (white circle) side when the clock voltage source Vck is at the low (L) level. The switches SWr, SWx, SWf and SWo are constructed so as to operate in an interlocking relation and to be alternately connected to the upper contact side and the lower contact side. Reference character Vb denotes a bias voltage source; Al an operational amplifier; Cf a feedback capacitor; Co an output capacitor for the ripple smoothing; Eo an output voltage; Cx a capacitor constructed by the moving electrode 161 and the fixed electrode 111; Cr a capacitor constructed by a reference electrode 51 and the fixed electrode 111; and Csx and Csr capacitors each constructed by the fixed electrode 111 and the substrate 100. Since an open loop gain of the operational amplifier Al is very large, an electric potential at a (−) input terminal of the operational amplifier is substantially equal to that at a (+) input terminal in consideration of the circuit construction. Thus, an electric potential of the fixed electrode output terminal 182 is set to the ground potential.

The specific operation of the capacitance-to-voltage converting circuit shown in FIG. 3 will now be described. The clock voltage source Vck is changed from the low level to the high level, and the switches SWr, SWx, SWf and SWo are connected to the upper contact side. At a time when the movement of charges is completed after that, since both of the electric potentials of the reference electrode 51 and fixed electrode 111 of the capacitor Cr are set to the ground potential, an amount of charges stored (or charged) in the capacitor Cr is equal to "0". Since an electric potential of the moving electrode 161 of the capacitor Cx is equal to a voltage (Vb) of the voltage source Vb and an electric potential of the fixed electrode 111 of the capacitor Cx is equal to the ground potential, the accumulation charges Qx in the capacitor Cx are equal to Cx·Vb. Since two terminals of the capacitor Cf are short-circuited by the switch SWf, the electric potentials at those terminals are equal to the electric potential of the fixed electrode output terminal 182, so that the accumulation charges of the capacitor Cf are equal to "0". Since the capacitor Co is disconnected from the output of the operational amplifier Al, the output voltage Eo of the capacitance-to-voltage converting circuit is holding the electric potential according to the charges stored at the last time when the clock voltage source Vck is at the low level.

Subsequently, the clock voltage source Vck is changed from the high level to the low level and the switches SWr, SWx, SWf and SWo are connected to the lower contact side. At a time when the movement of charges is completed after that, since the voltage across the capacitor Cx is equal to "0", the (+) charges are moved from the (−) input terminal of the operational amplifier Al toward the fixed electrode 111 in the direction adapted to set the accumulation charges to "0". Since the voltage across the capacitor Cr is equal to Vb, the (+) charges are moved from the fixed electrode 111 toward the (−) input terminal of the operational amplifier Al in the direction adapted to set the zero charges to the accumulation charges Qr (=Cr·Vb). Those charges are stored into the capacitor Cf since the switch SWf is open. The magnitude of the charges is expressed by the following equation.

$$Qr-Qx=Cr\cdot Vb-Cx\cdot Vb=Vb(Cr-Cx)$$

Therefore, a voltage Vcf across the capacitor Cf is expressed by the following equation.

$$Vcf=Vb(Cr-Cx)/Cf$$

Since one end of the capacitor Cf connected to the (−) input terminal of the operational amplifier Al is set to the zero potential, the polarity of the output voltage Eo of the capacitance-to-voltage converting circuit is inverted and the voltage Eo is expressed as follows.

$$Eo=Vb(Cx-Cr)/Cf$$

The capacitor Co stores the charges corresponding to this potential.

As mentioned above, for a period of time during which the clock voltage source Vck is at the high level, the charges are stored in the capacitor Cx, the charges in the capacitor Cf are set to "0", and the value for a period of time during which the clock voltage source Vck just before is at the low level is outputted as the output voltage Eo. For a period of time during which the clock voltage source Vck is at the low level, the charges in the capacitor Cx are set to "0", the charges are stored in the capacitor Cf, and the voltage expressed by Eo=Vb(Cx−Cr)/Cf is outputted as the output voltage Eo. Since the output voltage Eo is proportional to the capacitance of the capacitor Cx, it is inversely proportional to the reciprocal of the distance between the moving electrode 161 and the fixed electrode 111 which are formed as shown in FIGS. 1 and 2A–2G. The distance is proportional to the pressure applied to the diaphragm comprising the first insulating diaphragm layer 150, the first conductive layer 110 and the second insulating diaphragm layer 170. Therefore, the electrostatic capacitance detecting type pressure sensor from which the output voltage Eo that is inversely proportional to the reciprocal of the pressure applied to the diaphragm is outputted can be constructed.

However, in the apparatus of the electrostatic capacitance detecting type like the conventional pressure sensor mentioned above, since a micro capacitance of a capacitor constructed by the fixed electrode and the moving electrode is detected at a high input impedance, the electric lines of force from the outside of the apparatus drop to the fixed electrode, causing noises. The distance between the fixed electrode and the conductive layer existing in the lower layer of the fixed electrode is short, their parasitic electrostatic capacitance is larger than the capacitance to be detected and exerts a large influence on the capacitance-to-voltage converting circuit. In the foregoing conventional pressure sensor, the construction of the switched capacitor circuit is devised, thereby making it difficult to be influenced from the parasitic capacitance with the substrate. However, a circuit for generating a clock is necessary and the clock exerts an influence on another circuit.

Further, in the switched capacitor circuit with the construction like the conventional pressure sensor mentioned above, only the output voltage concerned with the reciprocal of the displacement of the diaphragm is obtained and an output directly regarding the displacement of the diaphragm cannot be obtained. As a converting system which has a simple construction and can obtain an output that is directly concerned with the displacement of the diaphragm, for example, there is a system for storing the constant charges into the fixed electrode and converting. However, according to the construction like the conventional pressure sensor mentioned above in which the parasitic capacitance between the fixed electrode and the substrate is large, the sensitivity is low and it is difficult to obtain the practical sensitivity.

In the capacitance-to-voltage converting circuit shown in FIG. 3, a device to shield the electric lines of force from the frontside surface of the substrate is made. That is, the voltage source or the ground is always connected to the moving electrode 161 which faces the frontside surface side of the pressure sensor and the reference electrode 51 although they are switched by a switch. Thus, even if the electric lines of force from an external noise source drop to the pressure sensor, since the charges flow to the ground through the voltage source or directly, they do not stray into the fixed electrode and there is a shielding effect against the electrostatic noises. However, no consideration is made to a device to shield against the electric lines of force which enter from the backside surface (surface on the lower side shown in FIGS. 2A–2G) of the substrate 100. This is because the general pressure sensor solves such a problem by a method whereby a conductive material also serving as a shield is used for a pressure vessel to enclose the pressure sensor. However, in case of constructing a smaller transducer, this solving measure becomes an obstacle.

SUMMARY OF THE INVENTION

It is an object of the invention to solve the foregoing conventional problems and to provide a transducer using a capacitance-to-voltage converting circuit for converting a change in electrostatic capacitance based on a mechanical displacement due to a static pressure or a dynamic pressure into an electric signal without being influenced by external noises.

According to the invention, there is provided a first transducer comprising: a guard electrode formed on a frontside surface of a substrate; an insulating layer deposited on an upper portion of the guard electrode; a fixed electrode formed on an upper portion of the insulating layer; and buffer amplifying means for driving the guard electrode so as to equalize an electric potential of the guard electrode with an electric potential of the fixed electrode.

In the transducer constructed as mentioned above, the electrostatic capacitance between the fixed electrode and the substrate is equivalently reduced and, further, the fixed electrode can be shielded against the electric lines of force arriving from the backside surface of the substrate. Therefore, a simple circuit construction in which the charges of the fixed electrode are made constant and are converted from a capacitance to a voltage can be used. Further, since the apparatus can be constructed without using a vessel also serving as a shield, the transducer can be more miniaturized. An output which is directly concerned with a mechanical displacement of the diaphragm or the like can be obtained.

According to the invention, there is provided a second transducer comprising: a guard electrode formed on a frontside surface of a substrate; an insulating layer deposited on an upper portion of the guard electrode; a fixed electrode formed on an upper portion of the insulating layer; buffer amplifying means for driving the guard electrode so that an electric w potential of the guard electrode is equalized to an electric potential of the fixed electrode; a through hole directing from a backside surface of the substrate and reaching the frontside surface; and a diaphragm layer deposited so as to close a frontside surface side of a cavity formed by dry-etching an area occupying substance on the upper portion of the fixed electrode via the through hole.

In the transducer constructed as mentioned above, the distance between the fixed electrode and the moving electrode changes due to a mechanical force such as an applied pressure, and the electrostatic capacitance Cx of the capacitor comprising the fixed electrode and the moving electrode changes. Since the constant charges Qx are stored in the fixed electrode and the moving electrode is connected to the ground, a voltage Vcx (=Qx/Cx) is generated across the capacitor and its value changes depending on the mechanical force. A change amount of the voltage Vcx across the capacitor is inversely proportional to the electrostatic capacitance Cx and a change amount of the electrostatic capacitance Cx is also inversely proportional to a change amount of the distance between the fixed electrode and the moving electrode. Thus, the output voltage of the capacitance-to-voltage converting circuit is finally set to a value that is directly concerned with the mechanical displacement.

When there is a parasitic capacitance between the fixed electrode and the ground potential, the parasitic capacitance is a capacitance which is not changed due to the mechanical force and such a parasitic capacitor is in parallel with the capacitor comprising the fixed electrode and the moving electrode. Therefore, a whole amount of the electrostatic capacitance Cx increases and a ratio to decide a conversion efficiency of the capacitance-to-voltage converting circuit (namely, a ratio between the change amount of the electrostatic capacitance Cx and the whole amount of the electrostatic capacitance Cx) decreases and the output voltage of the capacitance-to-voltage converting circuit decreases. However, in the second transducer according to the invention, the guard electrode is provided between the fixed electrode and the substrate and the guard electrode is driven by the buffer amplifying means so as to follow a voltage change of the fixed electrode. Thus, there is no movement of the charges between the fixed electrode and the guard electrode and the effective electrostatic capacitance can be set to an extremely small value.

Further, even if there are electric lines of force which enter from the backside surface of the substrate and go toward the fixed electrode, if an output impedance of the buffer amplifying means for driving the guard electrode is sufficiently small, the electric lines of force can be shut off by the guard electrode. It is particularly effective in case of using an integrated circuit wafer as a substrate material because wirings of an electric circuit are provided adjacent to the thin insulating layer. An area in which the circuit is formed can be also arranged in the lower layer of the fixed electrode. Thus, the wiring distance of the fixed electrode is shortened, the parasitic capacitance is reduced, and a transducer of higher sensitivity and smaller area can be manufactured.

According to the invention, therefore, the guard electrode is provided between the fixed electrode and the substrate and the guard electrode is driven by the buffer amplifying means so as to follow the voltage change of the fixed electrode, so that the effective electrostatic capacitance between the fixed electrode and the guard electrode can be set to an extremely small value.

By reducing the output impedance of the buffer amplifying means for driving the guard electrode, the electric lines of force entering from the backside surface of the substrate can be shut off by the guard electrode. Thus, even by the method of storing the constant charges into the fixed electrode and converting the capacitance into the voltage, a deterioration in sensitivity can be prevented and the apparatus can be constructed in a smaller scale than that of the switched capacitor circuit. The converted voltage can be set to the value directly concerned with the displacement of the diaphragm, the circuit can be arranged in the lower layer of the fixed electrode, and the apparatus can be miniaturized. Further, even when the apparatus is constructed by the switched capacitor circuit, switching noises from the clock circuit can be shut off by the guard electrode of a small parasitic capacitance and an interference to another circuit can be reduced.

According to the first aspect of the invention, there is provided a transducer comprising: a guard electrode formed on a frontside surface of a substrate; an insulating layer deposited on an upper portion of the guard electrode; a fixed electrode formed on an upper portion of the insulating layer; and buffer amplifying means for driving the guard electrode so that an electric potential of the guard electrode is equalized to an electric potential of the fixed electrode, wherein the transducer has a function such that an effective electrostatic capacitance between the fixed electrode and the guard electrode is set to an extremely small value and the electric lines of force entering from a backside surface of the substrate are shut off by the guard electrode.

According to the second aspect of the invention, there is provided a transducer comprising: a guard electrode formed on a frontside surface of a substrate; an insulating layer deposited on an upper portion of the guard electrode; a fixed electrode formed on an upper portion of the insulating layer; buffer amplifying means for driving the guard electrode so that an electric potential of the guard electrode is equalized to an electric potential of the fixed electrode; a through hole directing from a backside surface of the substrate and reaching the frontside surface; and a diaphragm layer deposited so as to close a frontside surface side of the substrate of a cavity formed by dry-etching an area occupying substance on the upper portion of the fixed electrode via the through hole, wherein the transducer has a function such that an effective electrostatic capacitance between the fixed electrode and the guard electrode is set to an extremely small value and the electric lines of force entering from the backside surface of the substrate are shut off by the guard electrode.

According to the third aspect of the invention, in the transducers of the first and second aspects mentioned above, a conductive layer covering the whole surface so as not to lead the electric lines of force from the outside to the fixed electrode is provided and the transducer has a function to shut off external electrostatic noises.

According to the fourth aspect of the invention, in the transducers of the first and second aspects mentioned above, as a semiconductor substrate obtained by integrating a circuit, the buffer amplifying means is integrated on the semiconductor substrate and the transducer has a function to miniaturize the apparatus.

According to the fifth aspect of the invention, in the transducers of the first and second aspects mentioned above, an electret layer holding charges in the upper portion of the fixed electrode is provided, and the transducer has a function to make a charging circuit unnecessary.

According to the sixth aspect of the invention, in the transducers of the first and second aspects mentioned above, an electret layer in which charges are implanted into a conductive layer surrounded by the insulating layer is provided on the upper portion of the fixed electrode, and the transducer has a function such that an amount of accumulation charges can be controlled and the sensitivity upon conversion from the displacement to the voltage can be varied.

According to the seventh aspect of the invention, in the transducers of the first and second aspects mentioned above, bias means for substantially making the charges of the fixed electrode constant is provided, and the transducer has a function such that charges are implanted by a power source circuit, thereby making the charges of the fixed electrode constant.

According to the eighth aspect of the invention, in the transducers of the first and second aspects mentioned above, means for applying an AC signal for detecting an electrostatic capacitance to the fixed electrode is provided, and the transducer has a function to detect a mechanical displacement from a change in AC impedance.

BRIEF DESCRIPTION OF THE DRAWINGS

FIGS. 2A–2G are cross sectional views showing manufacturing steps of the conventional transducer (pressure sensor);

FIGS. 5A–5G are cross sectional views showing manufacturing steps of the transducer according to the first embodiment;

FIG. 7 is a plan view of a transducer according to the second embodiment of the invention;

FIGS. 8A–8G are cross sectional views showing manufacturing steps of the transducer according to the second embodiment.

DETAILED DESCRIPTION OF THE EMBODIMENTS

Embodiments of the invention will now be described in detail hereinbelow with reference to FIGS. 4–9.
(First embodiment)

In a transducer according to the first embodiment of the invention, a fixed electrode is formed over a frontside surface of a semiconductor substrate. A guard electrode is provided in a lower layer of the fixed electrode via an insulating layer. A moving electrode is formed between layers of a diaphragm. A cavity is formed by the diaphragm, and a substrate through hole directing from a backside surface of the substrate and reaching the cavity is formed. An operational amplifier which drives the guard electrode so as to equalize an electric potential of the guard electrode with an electric potential of the fixed electrode is provided.

Figure 4:
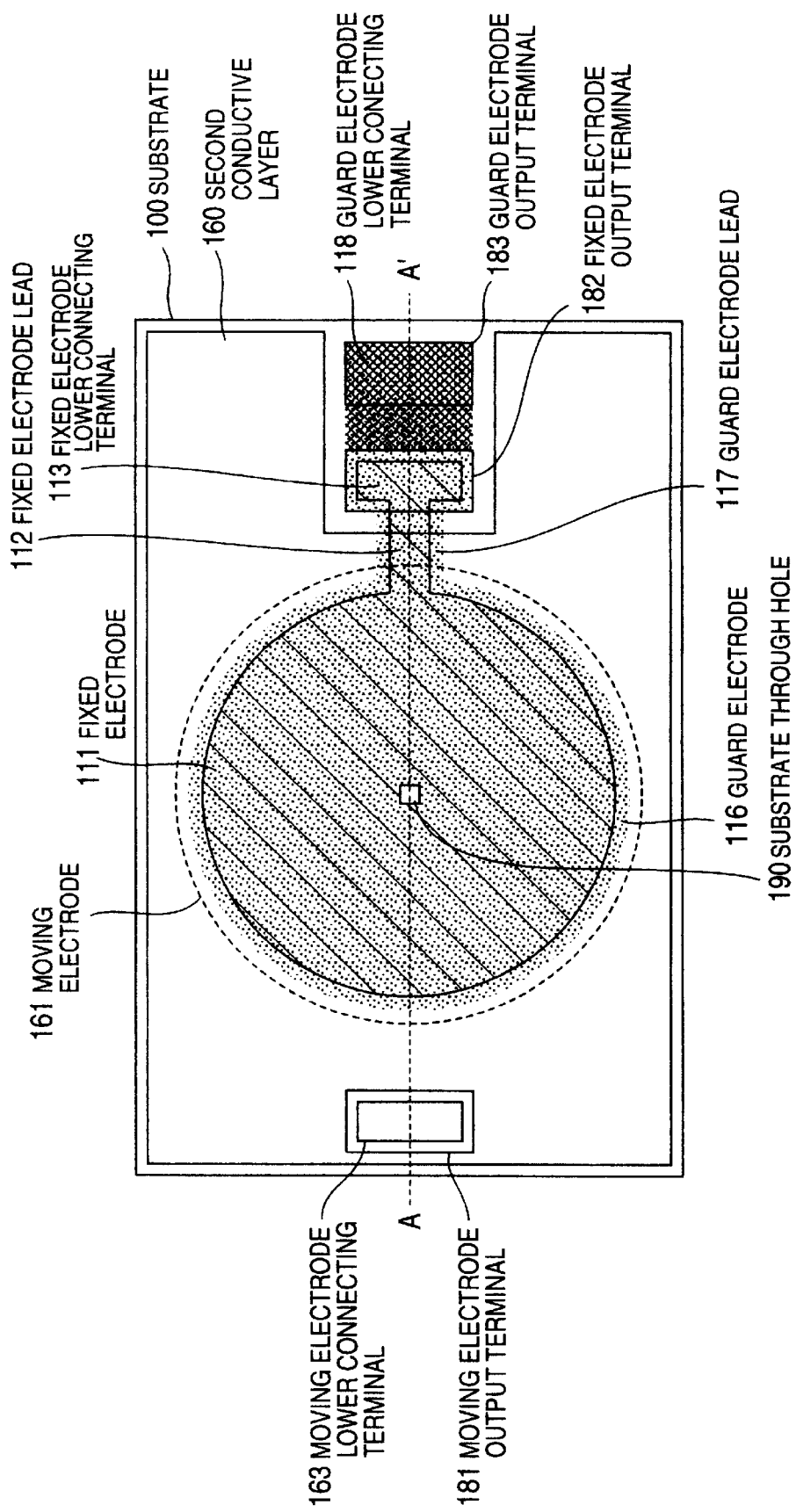
FIG. 4 is a plan view of a transducer according to the first embodiment of the invention.

FIG. 4 is a plan view of the transducer according to the first embodiment of the invention. FIGS. 5A–5G are cross sectional views showing the manufacturing steps of the transducer. The transducer is a dynamic pressure sensor for measuring a fluctuating pressure. That is, FIG. 4 is a plan view of the dynamic pressure sensor and mainly shows an arrangement of electrodes. FIGS. 5A–5G are cross sectional views taken along the line A–A' in FIG. 4 and show the manufacturing steps.

In FIGS. 4 and 5A–5G, a substrate 100 is a substrate made of monocrystalline silicon. A guard conductive layer 115 is a conductive layer the electric conductivity of which is improved by diffusing the impurities. A first insulating layer 120 is an insulating layer made of a material such as silicon oxide. A first conductive layer 110 is a conductive layer made of a material such as a metal having high electric conductivity. Reference numeral 141 (refer to FIG. 5G) denotes a cavity. A fixed electrode 111 is an electrode formed by the first conductive layer 110 in a plane area of the cavity 141. A third insulating layer 130 is an insulating layer made of a material such as silicon oxide. A diaphragm comprising a first insulating diaphragm layer 150, a second conductive layer 160 which has conductivity, and a second insulating diaphragm layer 170 is formed on an upper portion of the cavity 141. A moving electrode 161 and a diaphragm cover the whole frontside surface of the substrate 100 excluding the portions of a fixed electrode output terminal 182 and a guard electrode output terminal 183. The moving electrode 161 becomes a shielding layer to prevent the electric lines of force entering from the frontside surface direction of the substrate 100 from arriving at the fixed electrode 111. Reference numeral 190 (refer to FIG. 5F) denotes a substrate through hole. A sacrificial layer 140 (refer to FIG. 5B) is a layer which disappears when the manufacturing steps are finished.

The fixed electrode 111 is led to the fixed electrode output terminal 182 formed by a third conductive layer 180 through a fixed electrode lead 112 formed by the first conductive layer 110, a fixed electrode lower connecting terminal 113, and a fixed electrode connecting hole 132 formed in the upper portion of the fixed electrode lower connecting terminal 113. The moving electrode 161 is led to a moving electrode output terminal 181 formed by the third conductive layer 180 through a moving electrode lower connecting terminal 163 formed by the second conductive layer 160, and a moving electrode connecting hole 171 formed in an upper portion of the moving electrode lower connecting terminal 163. A guard electrode 116 is led to the guard electrode output terminal 183 which is formed by the third conductive layer 180, through a guard electrode lead 117 formed by the guard conductive layer 115, a guard electrode lower connecting terminal 118, and a guard electrode connecting hole 133 formed in an upper portion of the guard electrode lower connecting terminal 118. The size of the guard electrode 116 is set to be larger than the combined size of the fixed electrode 111, the fixed electrode lead 112 and the fixed electrode lower connecting terminal 113 so as to shut off the electric lines of force from the backside surface of the substrate 100.

A manufacturing process of the transducer according to the first embodiment will now be described with reference to FIGS. 5A–5G. As shown in FIG. 5A, the guard electrode 116, the guard electrode lead 117 and the guard electrode lower connecting terminal 118 all of which have the conductivity are formed by selectively diffusing the impurities into the shallow portion of the frontside surface (surface on the upper side in the diagram) of the substrate 100 made of monocrystalline silicon. The first insulating layer 120 made of silicon oxide or the like is deposited onto the frontside surface of the substrate 100. The fixed electrode 111, the fixed electrode lead 112 and the fixed electrode lower connecting terminal 113 are formed by depositing the first conductive layer 110 made of chromium or the like onto the first insulating layer 120. The third insulating layer 130 made of silicon oxide or the like is formed on the frontside surface of the substrate 100 and the first conductive layer 110.

Subsequently, after a sacrificial layer material of an organic matter such as polyimide is coated on the first conductive layer 110, by etching the sacrificial layer material of the portion other than the portion of the cavity 141, the sacrificial layer 140 is formed (refer to FIG. 5B). After that, as shown in FIG. 5C, the first diaphragm layer 150 made of silicon oxide or the like is formed on the third insulating layer 130 and the sacrificial layer 140. After the second conductive layer 160 made of chromium or the like is deposited onto the first diaphragm layer 150, by etching the second conductive layer 160 in the portions of the fixed electrode output terminal 182 and the guard electrode output terminal 183, a shielding layer including the moving electrode 161 and the moving electrode lower connecting terminal 163 is formed. After that, as shown in FIG. 5D, the second diaphragm layer 170 made of silicon oxide or the like is formed on the first diaphragm layer 150 and the second conductive layer 160.

Subsequently, as shown in FIG. 5E, holes which reach the fixed electrode lower connecting terminal 113, the moving electrode lower connecting terminal 163 and the guard electrode lower connecting terminal 118, respectively are formed from the second diaphragm layer 170. The third conductive layer 180 made of chromium or the like is deposited onto the second diaphragm layer 170, and then the third conductive layer 180 of the portion other than the portions of the moving electrode output terminal 181, the fixed electrode output terminal 182 and the guard electrode output terminal 183 is etched.

Subsequently, as shown in FIG. 5F, the substrate through hole 190 directing from the backside surface (surface on the lower side in the diagram) of the substrate 100 and reaching a center portion of the sacrificial layer 140 is formed. The sacrificial layer 140 is isotropically dry-etched through the substrate through hole 190 from the backside surface of the substrate 100 under an environment of plasma-excited gases mainly containing oxygen. Thus, the cavity 141 is formed between the third insulating layer 130 and the first diaphragm layer 150 (refer to FIG. 5G).

Subsequently, examples of dimensions of each portion of the transducer according to the first embodiment shown in FIG. 4 are shown. The diameter and thickness of the cavity 141 are equal to 1800 $\mu$m and 5 $\mu$m, respectively. The diameter of the substrate through hole 190 is equal to 100 $\mu$m. The thickness of the diaphragm comprising the first diaphragm layer 150 and the second diaphragm layer 170 is equal to 2 $\mu$m.

Figure 6:
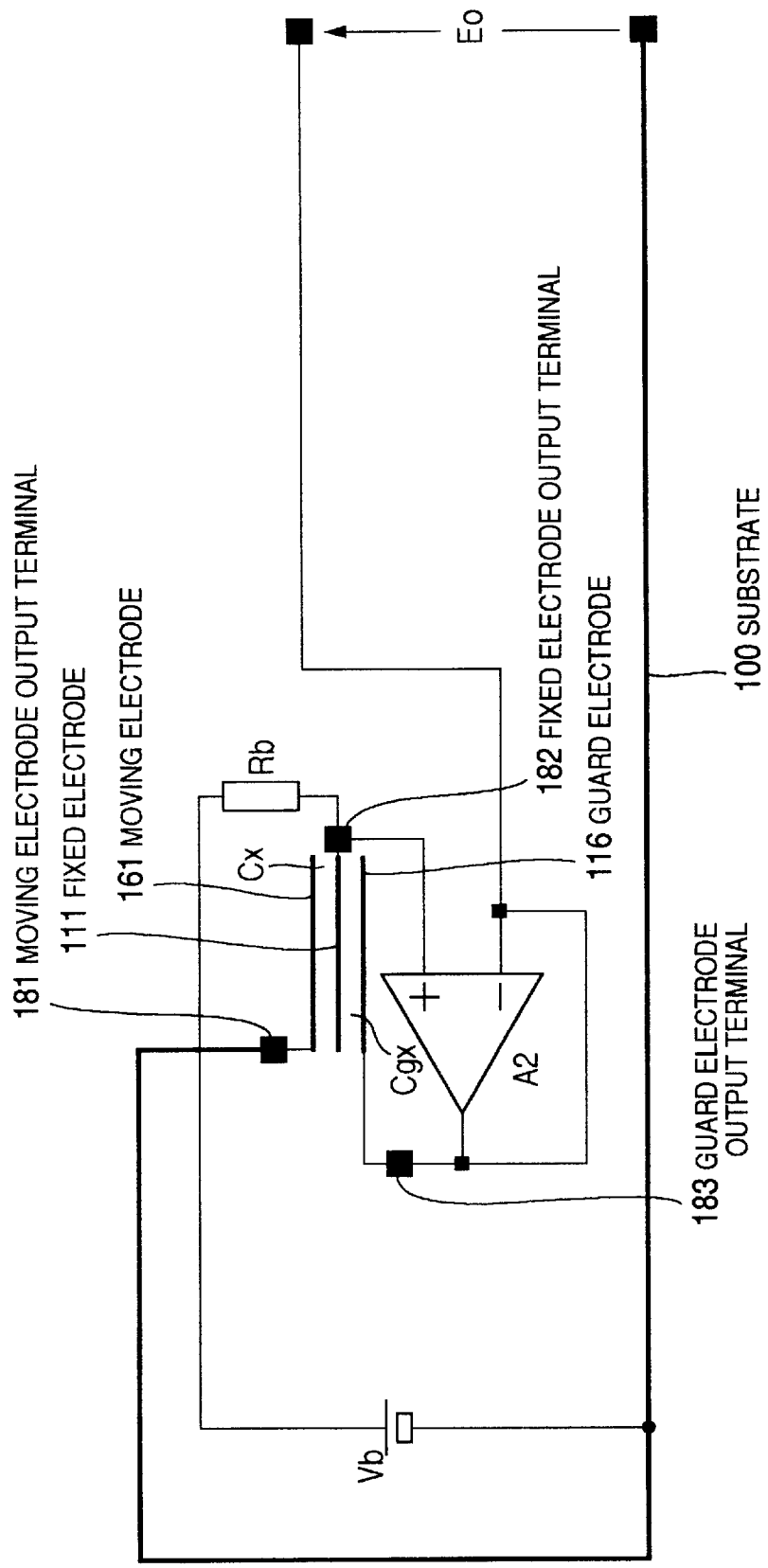
FIG. 6 is a circuit diagram of a capacitance-to-voltage converting circuit of the transducer according to the first embodiment.

The construction of the capacitance-to-voltage converting circuit in the transducer according to the first embodiment will now be described with reference to FIG. 6. FIG. 6 is a diagram showing the construction of the capacitance-to-voltage converting circuit of the dynamic pressure sensor shown in FIG. 4. The same component elements as those shown in FIG. 4 are designated by the same reference numerals. Reference numeral Cx denotes a capacitor constructed by the fixed electrode 111 and the moving electrode 161, and the value of the electrostatic capacitance is shown by "Cx". Reference numeral Cgx denotes a capacitor constructed by the fixed electrode 111 and the guard electrode 116, and the value of the electrostatic capacitance is shown by "Cgx". An operational amplifier A2 buffer-amplifies an electric potential of the fixed electrode 111 and operates so as to equalize an electric potential of the guard electrode 116 with the electric potential of the fixed electrode 111. A resistor Rb and the voltage source Vb are bias means for giving the constant charges to the fixed electrode 111. The time constant (Rb·Cx) of the resistor Rb and the capacitor Cx is now set to be longer than the longest period of the change period of the dynamic pressure to be measured.

Thus, in a range of the period of the signal to be measured by the dynamic pressure sensor, the charges Qx which are stored in the capacitor Cx can be regarded to be constant even if the diaphragm fluctuates. Reference numeral Eo denotes an output voltage of the transducer.

The operation of the transducer according to the first embodiment will now be described hereinbelow. The frontside surface of the transducer exists in a pressure space to be measured, and the pressure space to be measured is connected to the backside surface through an introducing pipe having a large resistance. Therefore, in the measuring period range, a pressure that is applied to the backside surface of the substrate 100 can be considered to be a static pressure of the pressure space to be measured, and a static pressure obtained by averaging the changes of the pressure space to be measured is applied from the backside surface side of the substrate 100 to the diaphragm comprising the first and second diaphragm layers. A pressure comprising the dynamic pressure and the static pressure is applied to the diaphragm from the frontside surface side of the substrate 100. Therefore, the diaphragm deforms in accordance with a difference between the pressure that is applied from the frontside surface side of the substrate 100 and the pressure which is applied from the backside surface side of the substrate 100. That is, the force in the direction adapted to widen the distance between the diaphragm and the fixed electrode by the static pressure applied from the backside surface of the substrate 100 and the force in the direction adapted to narrow the distance between the diaphragm and the fixed electrode to approach by the pressure comprising the dynamic pressure and the static pressure which are applied from the frontside surface of the substrate 100 are applied to the diaphragm. The diaphragm is deformed by an amount corresponding to only the dynamic pressure as the difference between both of the pressures. Thus, the value Cx of the electrostatic capacitance of the capacitor Cx constructed by the fixed electrode and the moving electrode formed on the diaphragm changes in accordance with the deformation of the diaphragm.

A voltage is applied from the voltage source Vb to the fixed electrode 111 via the resistor Rb, and the charges Qx are stored. The amount of the charges Qx is equal to Cx·Vb [C]. Even if the applied dynamic pressure changes and the value Cx of the electrostatic capacitance changes, the charges do not move because the time constant Rb·Cx is larger than such a change. Therefore, the change in the value Cx of the electrostatic capacitance appears as a voltage Vcx (=Qx/Cx) across the capacitor Cx. The buffer amplifying means comprising the operational amplifier A2 of the high input impedance receives the voltage Vcx, outputs as an output voltage Eo of a low output impedance, and drives the guard electrode 116. With this construction, since the electric potentials of the fixed electrode 111 and guard electrode 116 are equal, there is no movement of the charges between them. Thus, even if there is the capacitor Cgx having the electrostatic capacitance value Cgx, an influence by the capacitor Cgx for the change in the electrostatic capacitance value Cx can be set to almost zero.

In such a dynamic pressure sensor, now assuming that the distance between the moving electrode 161 and the fixed electrode 111 when the differential pressure is equal to "0" is labeled as L1 [m] and the effective area of the electrode is labeled as Sd [m$^2$], its electrostatic capacitance value Cx1 is expressed by Cx1=$\epsilon$Sd/L1. (where, $\epsilon$ is a dielectric constant and the existence of the layers of different dielectric constants is ignored here) Since the bias is applied from the voltage source Vb so that the voltage Vcx across the capacitor Cx is equal to Vb, the charges in the capacitor Cx are expressed by the following equation.

$$Cx1 \cdot Vb = Vb \cdot \epsilon \cdot Sd/L1 \equiv Qx$$

The charges in the capacitor Cgx are equal to "0" since the potential difference between the fixed electrode 111 and the guard electrode 116 is equal to "0". Now assuming that the pressure is applied to the diaphragm and the distance between the moving electrode 161 and the fixed electrode 111 changes to L2 [m], the value Cx of the electrostatic capacitance of the capacitor Cx is expressed by the following equation.

$$Cx = \epsilon \cdot Sd/L2 \equiv Cx2$$

Further, since the potential difference between the fixed electrode 111 and the guard electrode 116 is controlled to "0" as it is and there is no movement of the charges to the capacitor Cgx, the value of the charges Qx does not change. Therefore, the voltage (Qx1/Cx2) across the capacitor Cx is expressed by the following equation.

$$Qx1/Cx2 = (Vb \cdot \varepsilon \cdot Sd/L1)/(\varepsilon \cdot Sd/L2)$$
$$\equiv Vcx2$$

Thus, the change in the terminal voltage due to the change in the distance between the moving electrode 161 and the fixed electrode 111 is expressed by the following equation.

$$Vcx2 - Vb = (L2-L1)/L1 \cdot Vb$$

Therefore, by setting the impedance of the operational amplifier A2 which buffer-amplifies the voltage Vcx2 across the capacitor Cx, to the low impedance and measuring it by a voltmeter, the voltage regarding the displacement of the diaphragm is obtained as the output of the transducer.

It is now assumed that the guard electrode 116 driven by the operational amplifier A2 does not exist and the substrate 100 connected to the ground via the first insulating layer 120 exists under the fixed electrode 111. In this case, in the circuit shown in FIG. 6, the guard electrode 116 is connected to the ground and is in a state where the capacitor Cx and the capacitor Cgx are connected in parallel. Since the bias voltage Vb is applied to the parallel capacitors Cx and Cgx, the charges stored in the parallel capacitors Cx and Cgx are expressed by the following equation.

$$(Cx1 + Cgx)Vb = (\varepsilon \cdot Sd/L1 + Cgx)Vb$$
$$\equiv Qx3$$

When the pressure is applied to the diaphragm in this state and the distance between the moving electrode 161 and the fixed electrode 111 changes to L2 [m], the value of the parallel electrostatic capacitance of the capacitors Cx and Cgx is expressed by the following equation.

$$\epsilon \cdot Sd/L2 + Cgx = Cx3$$

Since the sum of the charges does not change, the voltage across the parallel capacitors Cx and Cgx is expressed by the following equation.

$$Qx3/Cx3 = ((\varepsilon \cdot Sd/L1 + Cgx)Vb)/(\varepsilon \cdot Sd/L2 + Cgx)$$

$$\equiv Vcx3$$

Thus, the change in the terminal voltage due to the change in the distance between the moving electrode 161 and the fixed electrode 111 is expressed by the following equation.

$$Vcx3-Vb=((L2-L1)/L1)\cdot(\varepsilon\cdot Sd/L2)/(\varepsilon\cdot Sd/L2+Cgx))\cdot Vb$$

When comparing this value with the value (Vcx2−Vb= (L2−L1)/L1·Vb) on which the capacitor Cgx does not exerts an influence, it will be understood that the term of ($\varepsilon$·Sd/L2)/($\varepsilon$·Sd/L2+Cgx) is newly added. This term shows the gain of the voltage dividing circuit constructed by the capacitors Cx2 and Cgx, and this means that when the capacitance of the capacitor Cgx increases, the ratio of the change in the terminal voltage due to the change in the distance between the moving electrode 161 and the fixed electrode 111 decreases to deteriorate the sensitivity.

As mentioned above, since the guard electrode 116 is provided between the fixed electrode 111 and the substrate 100 and the guard electrode 116 is driven by the buffer amplifying means (operational amplifier A2) so as to follow the voltage change of the fixed electrode 111, the effective electrostatic capacitance between the fixed electrode 111 and the guard electrode 116 can be set to an extremely small value. Thus, the transducer of the electrostatic capacitance detecting type which can detect a micro capacitance change can be constructed.

Since the guard electrode 116 of the low impedance exists between the fixed electrode 111 and the substrate 100, the fixed electrode 111 can be shielded against the electric lines of force arriving from the direction of the backside surface of the substrate 100. Therefore, even in the transducer for accumulating the constant charges into the fixed electrode 111 and converting the capacitance into the voltage, the deterioration of the sensitivity can be prevented, the apparatus can be constructed in a smaller scale than that of the switched capacitor circuit, and the amount directly concerned with the displacement of the diaphragm can be detected as a converted voltage. Further, the circuit can be arranged in the lower layer of the fixed electrode 111, so that the apparatus can be miniaturized. Even in case of constructing the apparatus by the switched capacitor circuit, the parasitic capacitance can be reduced by the guard electrode 116 and the switching noises to another circuit can be also shut off.

Although the DC voltage is applied through the resistor as a method of generating the charges of the fixed electrode 111 in the transducer according to the first embodiment, another method can be used. For example, an apparatus can be also formed by using a material such as an electret (for example, fluorocarbon polymer or Teflon) in which charges are stored without any bias from the outside and a charge storing step. In this case, there are advantages such that the DC voltage source is made unnecessary, and the voltage can be set to a large value without being restricted by the power source voltage to be supplied to the apparatus so that the sensitivity of converting the displacement into the voltage is improved. Besides the electret by a material, it is also possible to use an electret such that a structure in which the conductive layer is surrounded by the insulating layer is formed and means for supplying a tunnel current penetrating the insulating layer and reaching the conductive layer is provided, thereby allowing charges to be stored in the conductive layer surrounded by the insulating material. In this case, since an amount of accumulation charges can be easily controlled, the sensitivity upon conversion from the displacement to the voltage can be freely set.

In the transducer according to the first embodiment, the guard electrode 115 is formed by the diffusion layer whose conductivity is improved by diffusing the impurities into the substrate 100, the fixed electrode 111 is made of a material such as a metal, and they are insulated by the first insulating layer 120. However, it is sufficient that the guard electrode and the fixed electrode are insulated. A pn junction isolation like a bipolar integrated circuit can be also used. According to the pn junction isolation, the polarities of the impurities in the areas to be separated are set to the opposite polarities, a bias is #444 applied in the direction such as to reversely bias their pn junction, and a depletion layer thus obtained is used as an insulating layer. For example, it is sufficient to construct such that a whole p-type silicon substrate is set to the guard electrode, the fixed electrode in which n-type impurities are diffused into the surface is formed, and the guard electrode is driven by the operational amplifier A2 so that the electric potential of the fixed electrode is always higher than that of the guard electrode. In this case, although there is a problem such that a thickness of a depletion layer is very thin and a parasitic capacitance increases, since the guard electrode is driven by the buffer amplifying means so as to equalize the potential change of the guard electrode with that of the fixed electrode, the parasitic capacitance can be extremely reduced. With this structure, there is no need to form the first conductive layer 110 in the transducer according to the first embodiment.

As mentioned above, in the transducer according to the first embodiment of the invention, since the guard electrode is provided in the lower layer of the fixed electrode through the insulating layer and the operational amplifier which equalizes the electric potential of the guard electrode with that of the fixed electrode is provided, the fixed electrode is shielded, the micro capacitance change can be detected, the deterioration of the sensitivity can be prevented, and the amount directly concerned with the displacement of the diaphragm can be detected.

(Second embodiment)

In a transducer according to the second embodiment of the invention, a cavity is formed by isotropically dry-etching a sacrificial layer via a through hole formed from a backside surface of a semiconductor substrate. A guard electrode is provided between a fixed electrode and the substrate and between a reference fixed electrode and the substrate. A buffer amplifying apparatus for following an electric potential of the guard electrode to follow a voltage of the fixed electrode and a capacitance-to-voltage converting circuit constructed by a switched capacitor circuit are provided.

FIG. 7 is a plan view of the transducer according to the second embodiment of the invention. FIGS. 8A–8G are cross sectional views showing the manufacturing steps of the transducer. The transducer is a dynamic pressure sensor for measuring a fluctuating pressure and a method of forming a diaphragm and a guard electrode differs from that of the dynamic pressure sensor shown in FIG. 4. FIG. 7 is a plan view of the dynamic pressure sensor and is a diagram mainly showing an arrangement of electrodes. FIGS. 8A–8G are cross sectional views taken along the line A–A' in FIG. 7 and sequentially show the manufacturing steps. In the diagrams, reference numeral 100 denotes a substrate made of monocrystalline silicon, and 115 a guard conductive layer made of a material such as metal or the like having high electric conductivity. Reference numerals 120 and 125 denote first and second insulating layers made of a material such as silicon oxide or the like, respectively. Reference numeral 110 denotes a first conductive layer made of a material such as metal or the like having high electric conductivity, and 141 a cavity. Reference numeral 111 denotes a fixed electrode formed in the plane area of the cavity 141 by the first conductive layer 110. Reference numeral 130 denotes a third insulating layer made of a material such as silicon oxide. A diaphragm comprising a first conductive diaphragm layer 155 is formed on an upper portion of the cavity 141. Reference numeral 161 denotes a moving electrode. The diaphragm and the moving electrode 161 cover the whole frontside surface of the substrate 100 except for the portions of a fixed electrode output terminal 182 and a guard electrode output terminal 183. The moving electrode 161 also functions as a shielding layer to prevent the electric lines of force entering from the frontside surface side of the substrate 100 from arriving at the fixed electrode 111. Reference numeral 190 denotes a substrate through hole, and 140 a sacrificial layer etched while leaving the peripheral portion of the diaphragm at the end of the manufacturing steps.

The manufacturing process of the transducer according to the second embodiment will now be described with reference to FIGS. 8A–8G. As shown in FIG. 8A, the first insulating layer 120 made of silicon oxide or the like is deposited onto the frontside surface (surface on the upper side in the diagram) of the substrate 100 made of monocrystalline silicon. By depositing the guard conductive layer 115 having conductivity onto the first insulating layer 120, the guard electrode 116, the guard electrode lead 117 and the guard electrode lower connecting terminal 118 all of which have conductivity are formed. The second insulating layer 125 made of silicon oxide or the like is deposited onto the first insulating layer 120 and the guard conductive layer 115. By depositing the first conductive layer 110 made of chromium or the like onto the second insulating layer 125, the fixed electrode 111, the fixed electrode lead 112 and the fixed electrode lower connecting terminal 113 are formed.

Subsequently, as shown in FIG. 8B, the third insulating layer 130 made of silicon oxide or the like is deposited onto the second insulating layer 125 and the first conductive layer 110. After a sacrificial layer material of an organic matter such as polyimide is coated onto the third insulating layer 130, by etching the sacrificial layer material of the portion other than the portion of the cavity 141, the sacrificial layer 140 is formed (refer to FIG. 8C). After the first conductive diaphragm layer 155 made of an alloy mainly containing aluminum is formed on the third insulating layer 130 and the sacrificial layer 140, by etching the first diaphragm layer 155 existing in the portions of the fixed electrode output terminal 182 and the guard electrode output terminal 183, a shielding layer including the moving electrode 161 and the moving electrode lower connecting terminal 163 is formed (refer to FIG. 8D).

Subsequently, as shown in FIG. 8E, holes which reach the fixed electrode lower connecting terminal 113, the moving electrode lower connecting terminal 163 and the guard electrode lower connecting terminal 118, respectively are formed from the third insulating layer 130. After the third conductive layer 180 made of chromium or the like is deposited onto the first diaphragm layer 155 and the third insulating layer 130, the third conductive layer 180 of the portion except for the portions of the moving electrode output terminal 181, the fixed electrode output terminal 182 and the guard electrode output terminal 183 is etched.

Subsequently, the substrate through hole 190 directing from the backside surface (surface on the lower side in the diagram) of the substrate 100 and reaching the sacrificial layer 140 is formed in the center portion of the sacrificial layer 140 (refer to FIG. 8F). The sacrificial layer 140 is isotropically dry-etched via the substrate through hole 190 from the backside surface of the substrate 100 under an environment of plasma excited gases mainly containing oxygen. The cavity 141 is formed between the third insulating layer 130 and the first conductive diaphragm layer 155. In this instance, a processing time is managed in a manner such that the sacrificial layer 140 slightly remains in the diaphragm peripheral portion instead of perfectly etching the sacrificial layer 140, thereby raising supporting performance of a rim (refer to FIG. 8G).

Figure 1:
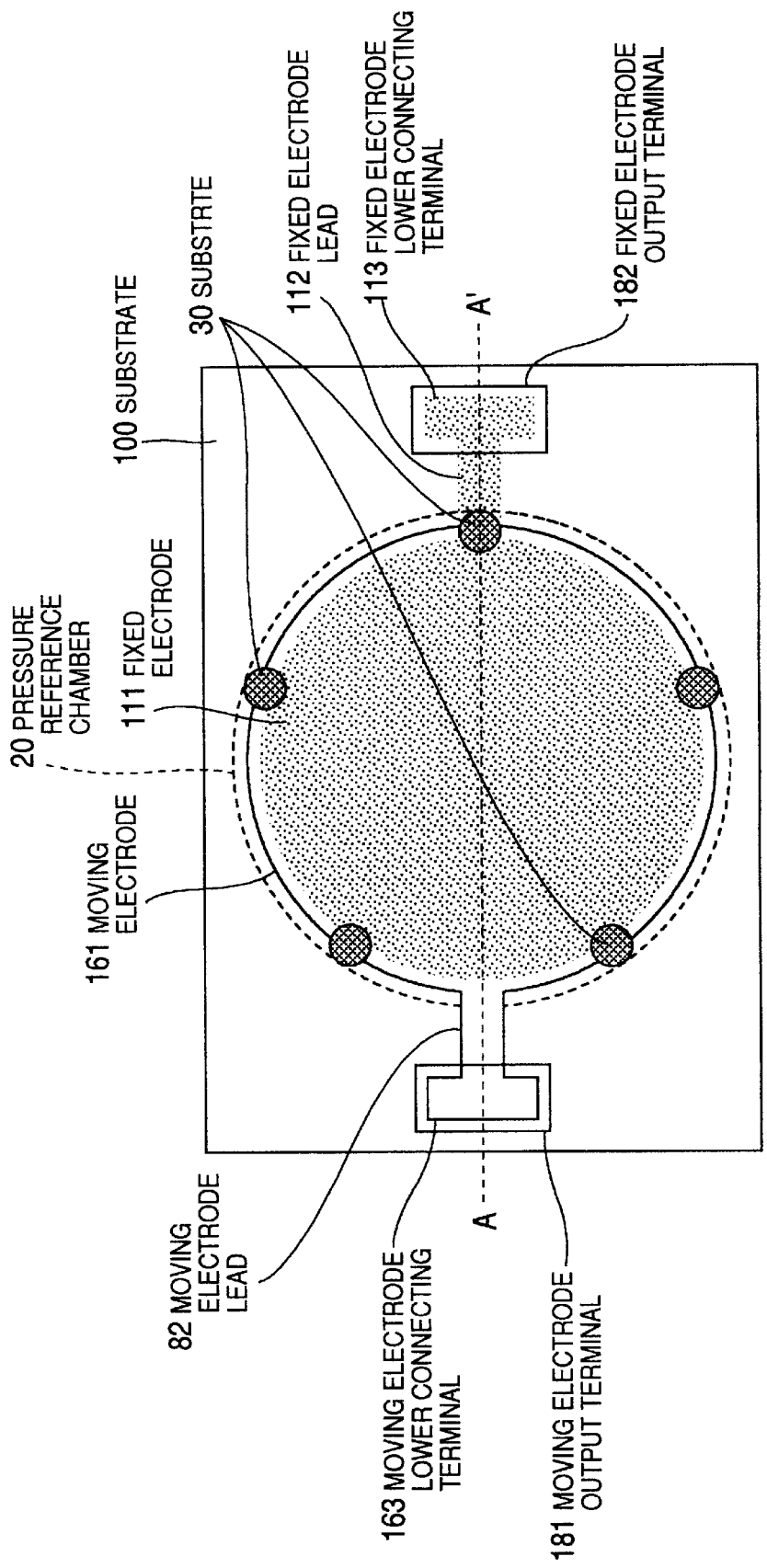
FIG. 1 is a plan view of a conventional transducer (pressure sensor)
Figure 3:
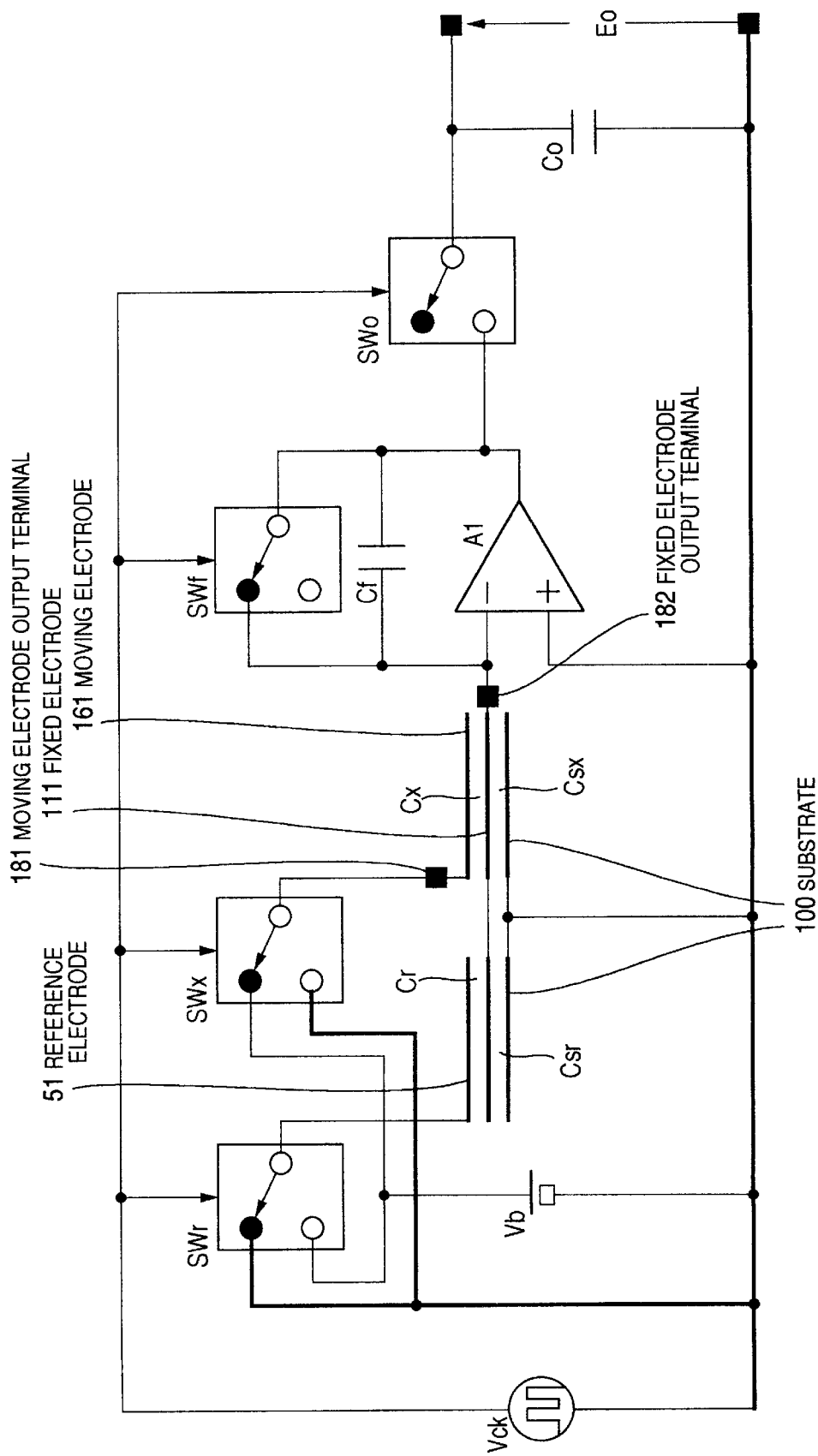
FIG. 3 is a circuit diagram of a capacitance-to-voltage converting circuit of the conventional transducer (pressure sensor)
Figure 9:
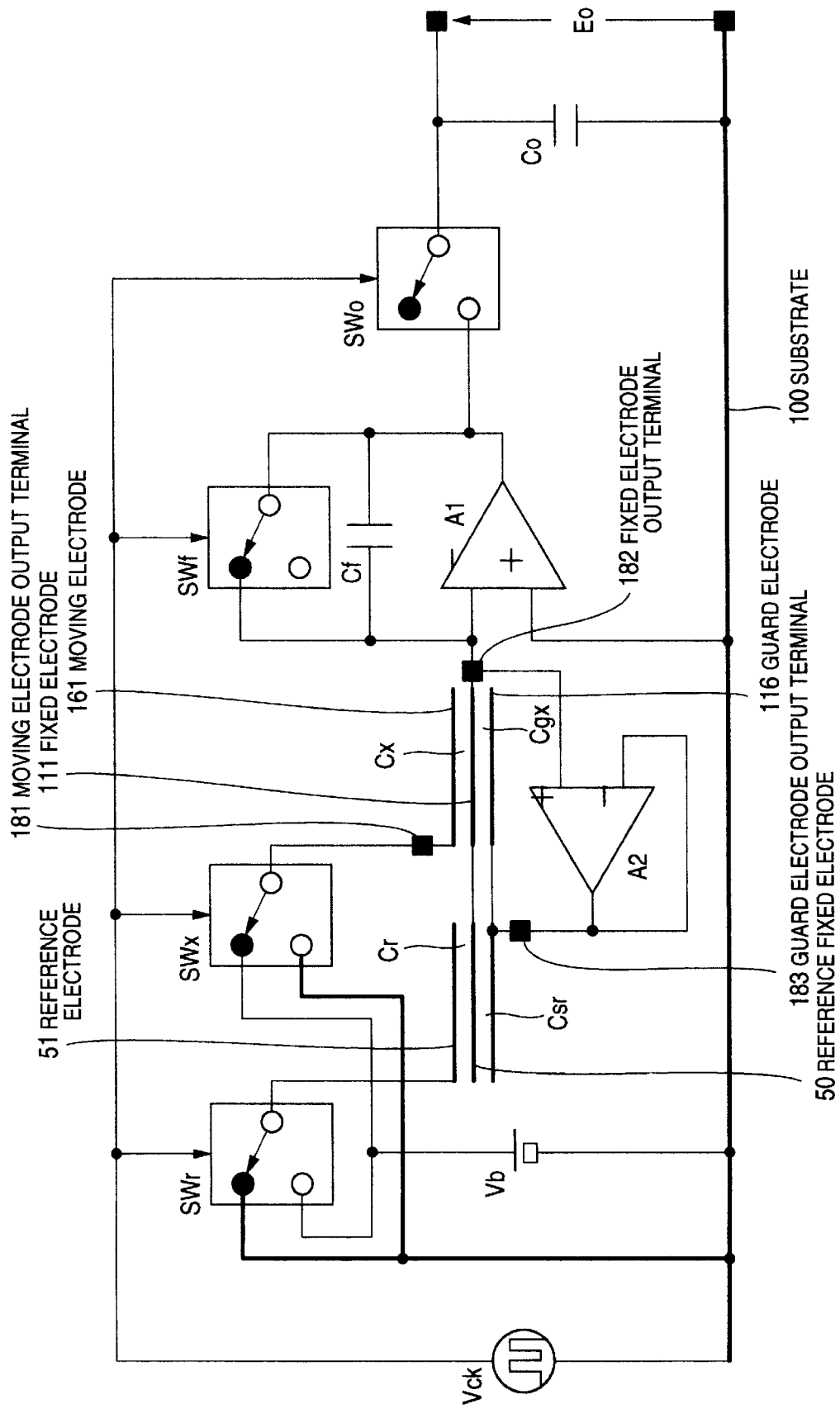
FIG. 9 is a circuit diagram of a capacitance-to-voltage converting circuit of the transducer according to the second embodiment.

A construction of a capacitance-to-voltage converting circuit in the transducer according to the second embodiment will now be described with reference to FIG. 9. FIG. 9 is a diagram showing the construction of the capacitance-to-voltage converting circuit that is used in the dynamic pressure sensor shown in FIG. 7. Although the capacitance-to-voltage converting circuit is constructed by a switched capacitor circuit in a manner similar to the conventional capacitance-to-voltage converting circuit shown in FIG. 3, it differs in that the guard electrode 116 and the operational amplifier A2 are provided between the fixed electrode 111 and the substrate 100 connected to the ground. That is, the operational amplifier A2 constructs a voltage follower in which a (−) input terminal and an output terminal are connected and a voltage of the same magnitude as that of a voltage applied to a (+) input terminal appears at the output terminal. The guard electrode 116 is driven by the output voltage of the operational amplifier A2. The same component elements shown in FIGS. 3 and 6 are designated by the same reference numerals. A reference capacitor (not shown) is also a similar structure in which the etching of the sacrificial layer is not performed. The operation of each switch and a moving state of the charges of each capacitor are also the same as those in the conventional capacitance-to-voltage converting circuit shown in FIG. 3.

The switches SWr, SWx, SWf and SWo of the voltage control type are connected to the upper contact side when the clock voltage source Vck is at the high (H) level, and are connected to the lower contact side when it is at the low (L) level. The switches SWr, SWx, SWf and SWo are interlocked and constructed so as to be alternately connected to the upper contact side and the lower contact side. Reference numeral Vb denotes the bias voltage source; Al the operational amplifier; Cf the feedback capacitor; Co the output capacitor for the ripple smoothing; Eo the output voltage; Cx the capacitor comprising the moving electrode 161 and the fixed electrode 111; Cr the capacitor comprising the reference electrode 51 and a reference fixed electrode 50; Cgx the capacitor comprising the fixed electrode 111 and the guard electrode 116; and Cgr a capacitor comprising the reference fixed electrode 50 and the guard electrode 116. Since the open loop gain of the operational amplifier Al is very large, the electric potential at the (−) input terminal of the operational amplifier Al is equal to that of the (+) input terminal. Therefore, the electric potential at the output terminal of the fixed electrode 111 is equal to the ground potential.

The specific operation of the capacitance-to-voltage converting circuit in the transducer according to the second embodiment will now be described. When the clock voltage source Vck changes from the low level to the high level, all of the switches SWr, SWx, SWf and SWo are connected to the upper contact side. At a time when the movement of the charges is completed, both of the electric potentials of the reference electrode 51 and reference fixed electrode 50 of the capacitor Cr are equal to the ground potential, so that the accumulation charges of the capacitor Cr are equal to "0". Since the electric potential of the moving electrode 161 of the capacitor Cx is equal to the voltage Vb of the voltage source Vb and the electric potential of the fixed electrode 111 is equal to the ground potential, the accumulation charges Qx of the capacitor Cx are expressed by Cx·Vb. Since two terminals of the capacitor Cf are short-circuited by the switch SWf, both of the electric potentials at those terminals are equal to those at the fixed electrode output terminal 182, so that the accumulation charges of the capacitor Cf are equal to "0".

The output voltage Eo of the capacitance-to-voltage converting circuit is holding the electric potential according to the charges stored at the last time when the voltage source Vck is at the low level because the capacitor Co is disconnected from the output of the operational amplifier Al. Since the capacitors Cgx and Cgr are also controlled by the operational amplifier A2 so that the electric potential of the guard electrode 116 is equal to that of each of the fixed electrode 111 and the reference fixed electrode 50, the accumulation charges are equal to "0".

When the voltage source Vck changes from the high level to the low level, all of the switches SWr, SWx, SWf and SWo are connected to the lower contact side. At a time when the movement of the charges is completed, the voltage across the capacitor Cx is equal to "0", so that the (+) charges move from the (−) input terminal of the operational amplifier Al toward the fixed electrode 111 in the direction such that the accumulation charges are set to "0". Since the voltage across the capacitor Cr is equal to Vb, the (+) charges move from the fixed electrode 111 toward the (−) input terminal of the operational amplifier Al in the direction such that the charges in the zero state increase to the accumulation charges Qr (=Cr·Vb). Since the switch SWf is open, those charges are stored into the capacitor Cf and the amount of charges is expressed by the following equation.

$$Qr-Qx=Cr \cdot Vb-Cx \cdot Vb=Vb(Cr-Cx)$$

Therefore, the voltage Vcf across the capacitor Cf is expressed by the following equation.

$$Vcf=Vb(Cr-Cx)/Cf$$

Since the electric potential at one end of the capacitor Cf connected to the (−) input terminal of the operational amplifier Al is equal to "0", the polarity of the output voltage Eo of the capacitance-to-voltage converting circuit is inverted and Eo is expressed by the following equation.

$$Eo=Vb(Cx-Cr)/Cf$$

The capacitor Co stores the charges corresponding to this electric potential. Since each of the terminals of the capacitors Cgx and Cgr is still controlled to the same potential, the accumulation charges of the capacitors Cgx and Cgr are equal to "0" and the capacitors Cgx and Cgr hardly exert an influence on the operation of the movement of the charges.

At the time of the movement of the charges, if a response speed based on a through rate or the like of the operational amplifier Al is slow, a spike-like voltage is generated at the (−) input terminal of the operational amplifier Al which ought to have been set to the ground potential. By rapidly changing the output voltage of the operational amplifier Al, this inherently operates so as to narrow the charges flowing to the (−) input terminal to be promptly stored into the feedback capacitor Cf and not to change the electric potential at the (−) input terminal. However, since there is generally a limitation in the response speed, the charges often temporarily overflow and the electric potential at the (−) input terminal is momentarily improved (or reduced). Although the overflowed charges are temporarily stored into the parasitic capacitor associated in the fixed electrode 111 and the reference fixed electrode 50, they are stored into the feedback capacitor Cf with the elapse of time.

As mentioned above, for a period of time during which the voltage source Vck is at the high level, the charges are stored in the capacitor Cx, the charges of the capacitor Cf are set to "0", and the value for a period of time during which the voltage source Vck is at the low level just before is outputted as the output voltage Eo. For a period of time during which the voltage source Vck is at the low level, the charges of the capacitor Cx are set to "0", the charges are stored in the capacitor Cf, and the voltage Eo which is expressed by the following equation is generated as the output voltage Eo.

$$Eo=Vb(Cx-Cr)/Cf$$

The value of the output voltage Eo is concerned with the reciprocal of the distance between the moving electrode 161 and the fixed electrode 111 which are formed as shown in FIGS. 7 and 8A–8G. This distance relates to the pressure applied to the diaphragm comprising the first conductive diaphragm layer 155. Therefore, the electrostatic type pressure sensor which generates the output voltage Eo concerned with the reciprocal of the pressure applied to the diaphragm can be constructed.

In the capacitance-to-voltage converting circuit shown in FIG. 9, the voltage source or the ground is always connected to the moving electrode 161 and the reference electrode 51 which face the frontside surface side of the pressure sensor although they are switched by the switch. Therefore, even if the electric lines of force from the external noise source drop to the pressure sensor, since the charges flow to the ground through the voltage source or directly, they do not stray into the fixed electrode 111 and the apparatus has a shielding effect against the electrostatic noises. Since the electric lines of force from the backside surface of the substrate 100 drop to the guard electrode 116 which is driven at the low impedance by the operational amplifier A2, they do not reach the fixed electrode 111 and the reference fixed electrode 50, and the noises from the backside surface of the substrate 100 can be blocked. Therefore, there is no need to enclose the apparatus into a vessel considering an electrostatic shield like a conventional pressure sensor. The apparatus can be formed in a small size.

As mentioned above, the guard electrode 116 is provided between the fixed electrode 111 and the substrate 100 and between the reference fixed electrode 50 and the substrate 100, and the guard electrode 116 is driven by the buffer amplifying means A2 so as to follow the voltage change of the fixed electrode 111. Therefore, the effective electrostatic capacitance between the fixed electrode 111 and the guard electrode 116 and the effective electrostatic capacitance between the reference fixed electrode 50 and the guard electrode 116 can be set to extremely small values. Thus, a transducer of an electrostatic capacitance detecting type that can detect a micro capacitance change can be constructed.

Since the guard electrode 116 of the low impedance exists between the fixed electrode 111 and the substrate 100 and between the reference fixed electrode 50 and the substrate 100, the fixed electrode 111 and the reference fixed electrode 50 can be shielded against the electric lines of force which arrive from the direction of the backside surface of the substrate 100. Further, the circuit can be arranged in the lower layer of the fixed electrode 111 and the apparatus can be miniaturized.

In the description of the transducers according to the first and second embodiments, the capacitance-to-voltage converting circuit is shown as examples with respect to the method of making the charges constant and measuring the terminal voltage by the high impedance circuit and the method by the switched capacitor circuit to convert the capacitance into the voltage by the movement or accumulation of the charges of the amount concerned with the displacement amount. However, another capacitance detecting method can be used. For example, it is also possible to use a method whereby an AC voltage (current) of a high frequency is applied and a current (voltage) corresponding thereto is measured or a method whereby an inductor is provided in the outside and a resonance circuit is formed and a change in resonance frequency is made correspond to a capacitance change. Even in those cases, since a radiation of the high frequency signal to another portion becomes a cause of obstructing the normal operation of an electronic circuit, it is desirable to shut off such a signal. As a parasitic capacitance such as to obstruct the measurement of a slight capacitance change is smaller, the sensitivity can be improved.

In the transducers according to the first and second embodiments, although the diaphragm is formed by etching the sacrificial layer, the forming method of the diaphragm is not limited to it. For instance, it is also possible to adhere the substrate having the fixed electrode and the capacitance-to-voltage converting circuit and the like and a structure in which the diaphragm and its supporting portion are formed. Even in such a case, by driving the guard electrode by using the buffer amplifying means, a transducer having a function such as reduction of the parasitic capacitance, electrostatic shield from the backside surface of the substrate, or the like as mentioned in the description of the transducers according to the first and second embodiments can be constructed.

Although the transducers according to the first and second embodiments are described with respect to the transducers applied to the pressure sensor, even in case of applying to a transducer in which another kind of displacement is detected by an electrostatic capacitance, a transducer having a function as mentioned in the description of the transducers according to the first and second embodiments can be constructed.

In the transducers according to the first and second embodiments, the fixed electrode of the high impedance and the moving electrode of the low impedance which faces the fixed electrode are used. However, such a mechanical fixed or moving distinction can be reversed. For example, the transducer can be constructed by a moving electrode of the high impedance and a fixed electrode of the low impedance which faces the moving electrode. This construction is effective in the case where the material of the mechanical moving portion is silicon and it is proper to assemble the buffer amplifying means onto this material.

In FIGS. 4 and 7 showing the transducers according to the first and second embodiments, the second conductive layer 160 and the first conductive diaphragm layer 155 which are used to electrostatically shield the frontside surface of the substrate are deposited in three directions (upper, left and lower directions in the diagram) around the fixed electrode output terminal 182. However, an enclosure which is connected to the guard electrode output terminal 18 may be formed so as to surround the fixed electrode output terminal 182 between the layer 160 or 155 and the fixed electrode output terminal 182. In this case, the leakage current from the surface of the fixed electrode is prevented and the parasitic capacitance in the plane direction can be reduced.

As mentioned above, in the transducer according to the second embodiment of the invention, the guard electrode is provided between the fixed electrode and the substrate and between the reference fixed electrode and the substrate, and the buffer amplifier which drives the guard electrode so as to follow the electric potential of the fixed electrode is provided. Therefore, the fixed electrode and the reference fixed electrode can be shielded and a micro capacitance change can be detected.

According to the invention as mentioned above, since the guard electrode is provided so as to follow the voltage change of the fixed electrode, effects such that the parasitic capacitance between the fixed electrode and the substrate can be equivalently reduced and the capacitance-to-voltage converting sensitivity can be improved are obtained.

Since the output impedance of the buffer amplifying means for driving the guard electrode is reduced, the fixed electrode can be shielded against the electric lines of force arriving from the backside surface of the substrate. A damage due to the electrostatic noises from the outside of the apparatus can be reduced. The apparatus itself has the electrostatic shield function. Thus, effects such that an external shielding vessel is unnecessary and a smaller transducer can be constructed are obtained.

Since the parasitic capacitance is reduced by providing the guard electrode, an effect such that an output directly concerned with the displacement of the diaphragm can be taken by using the circuit for making the charges of the fixed electrode constant and converting the capacitance into the voltage is obtained.

Since the switching noises can be shut off by providing the guard electrode, an effect such that a switched capacitor circuit can be used is obtained.

Since high frequency noises can be shut off by providing the guard electrode, an effect such that a capacitance-to-voltage converting system using a high frequency can be used is obtained.

What is claimed is:

1. A transducer comprising:
   a guard electrode formed on a frontside surface of a substrate;
   an insulating layer deposited on an upper portion of said guard electrode;
   a fixed electrode formed on an upper portion of said insulating layer; and
   buffer amplifying means for driving said guard electrode so as to equalize an electric potential of said guard electrode with an electric potential of said fixed electrode.

2. A transducer according to claim 1, further comprising a conductive layer covering a whole surface so as not to guide electric lines of force from an outside to said fixed electrode.

3. A transducer according to claim 1, wherein
   said substrate is a circuit integrated semiconductor substrate, and
   said buffer amplifying means is integrated on said semiconductor substrate.

4. A transducer according to claim 1, further comprising an electret layer provided on an upper portion of said fixed electrode and for holding charges.

5. A transducer according to claim 1, further comprising an electret provided on an upper portion of said fixed electrode and for implanting charges into a conductive layer surrounded by the insulating layer.

6. A transducer according to claim 1, further comprising bias means for making charges of said fixed electrode substantially constant.

7. A transducer according to claim 1, further comprising means for applying an AC signal for detecting an electrostatic capacitance to said fixed electrode.

8. A transducer comprising:
   a guard electrode formed on a frontside surface of a substrate;
   an insulating layer deposited on an upper portion of said guard electrode;
   a fixed electrode formed on an upper portion of said insulating layer;
   buffer amplifying means for driving said guard electrode so as to equalize an electric potential of said guard electrode with an electric potential of said fixed electrode;
   a through hole directing from a backside surface of said substrate toward the frontside surface; and
   a diaphragm layer deposited so as to close a frontside surface side of a cavity formed by dry-etching an area occupying substance in the upper portion of said fixed electrode via said through hole.

9. A transducer according to claim 8, further comprising a conductive layer covering a whole surface so as not to guide electric lines of force from an outside to said fixed electrode.

10. A transducer according to claim 8, wherein
    said substrate is a circuit integrated semiconductor substrate, and
    said buffer amplifying means is integrated on said semiconductor substrate.

11. A transducer according to claim 8, further comprising an electret layer provided on the upper portion of said fixed electrode and for holding charges.

12. A transducer according to claim 8, further comprising an electret provided on the upper portion of said fixed electrode and for implanting charges into a conductive layer surrounded by an insulating layer.

13. A transducer according to claim 8, further comprising bias means for making charges of said fixed electrode substantially constant.

14. A transducer according to claim 8, further comprising means for applying an AC signal for detecting an electrostatic capacitance to said fixed electrode.

* * * * *